UNITED STATES PATENT OFFICE.

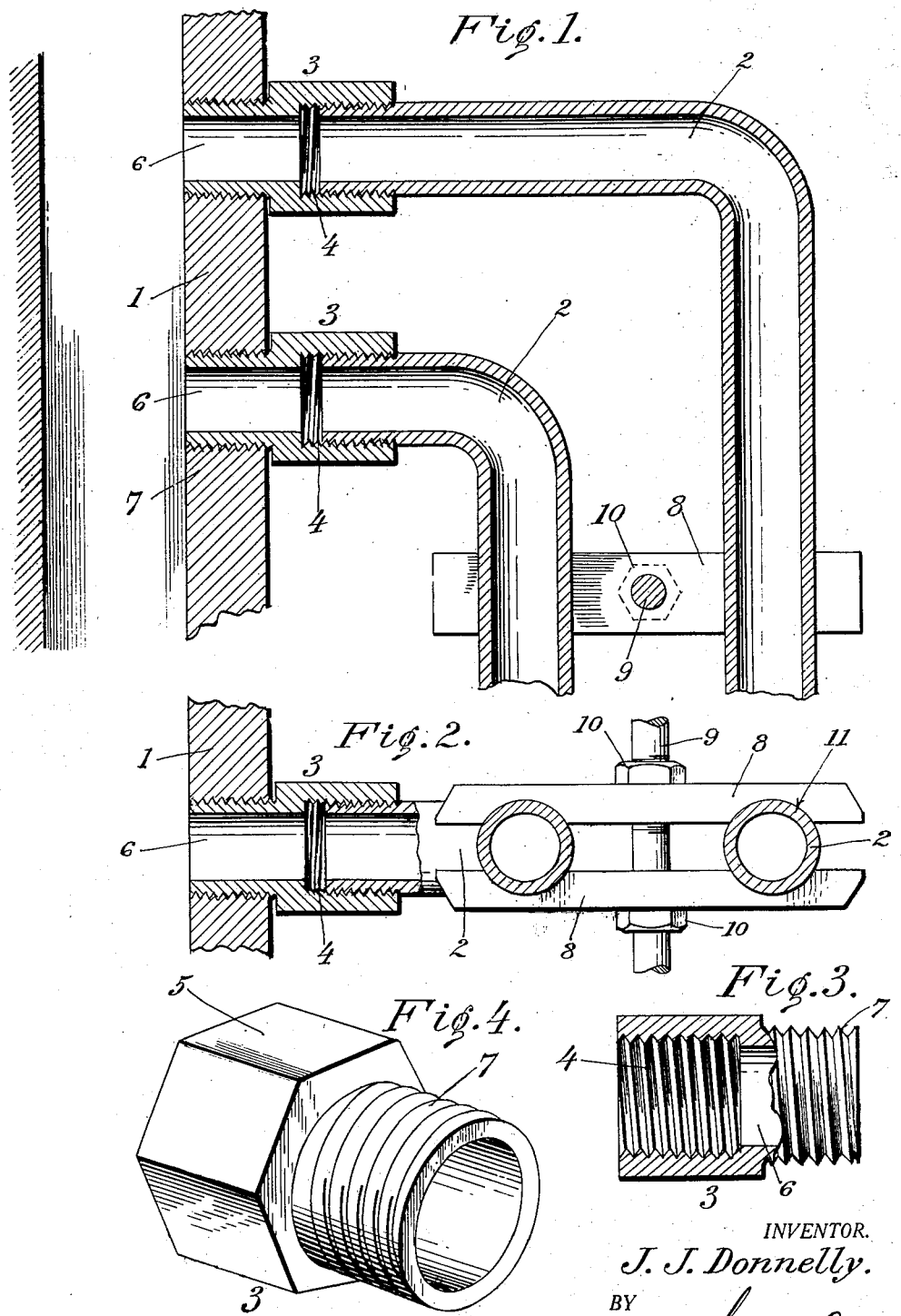

JOHN J. DONNELLY, OF HORTON, KANSAS.

SUPERHEATER UNIT.

1,325,147.    Specification of Letters Patent.    Patented Dec. 16, 1919.

Application filed January 8, 1919. Serial No. 270,175.

*To all whom it may concern:*

Be it known that I, JOHN J. DONNELLY, a citizen of the United States, residing at Horton, in the county of Brown and State of Kansas, have invented certain new and useful Improvements in Superheater Units, of which the following is a specification.

The object of this invention is to avoid leaky joints in superheaters and to provide a construction whereby the superheater units will be firmly supported and connected to the header or manifold.

A further object of the invention is to provide a construction whereby the unit may be secured to the header quickly and easily and the necessity for regrinding parts of the joint will be overcome.

These several stated objects and other objects which will incidentally appear in the course of the following description are attained in the use of such a structure as is illustrated in the accompanying drawings, and the invention resides in certain novel features which will be hereinafter first fully described and then particularly pointed out in the appended claims.

In the drawings:

Figure 1 is a view showing parts of two superheater units secured together and connected with a portion of the manifold or header, the several parts being shown in section;

Fig. 2 is a view showing parts in section and parts in end elevation;

Fig. 3 is a view of the coupling partly in longitudinal section and partly in side elevation;

Fig. 4 is an enlarged detail perspective view of the coupling.

Corresponding and like parts are referred to in the following description and indicated in all the views of the acompanying drawings by the same reference characters.

In carrying out my invention I may employ the usual header or manifold indicated at 1, and the superheater tubes or pipes 2 may be of the usual form having their ends turned inwardly toward the header or manifold. In accordance with my invention the ends of the tubes or pipes 2 do not enter the manifold or header but are externally threaded to engage in the outer bore of a coupling 3. This coupling is a compound sleeve having its outer end internally threaded as shown at 4 and provided externally with flat faces 5, whereby it may be engaged by a wrench or other turning tool. The inner end 6 of the coupling is of less diameter than the outer end and the bore of the inner end is smooth, as clearly shown, while the external surface of the same is threaded as shown at 7. The threads 4 and 7 are reversed relative to each other so that when the coupling has its inner end engaged in the opening in the header and its outer end engaged over the end of the tube or pipe, the rotation of the coupling will draw the parts together so that a tight joint will be readily effected. To further insure the leakproof qualities of the joint the threaded portions of the couplings, as well as the threaded ends of the several tubes or pipes and the bores or openings in the header, are slightly tapered so that as the threaded engagement of the parts continues they will tend to wedge so that leaking of the joint will be avoided without the use of any packing.

The superheater pipes or tubes 2 are arranged in banks with two or more tubes or pipes in each bank, and to support the same against sagging and thereby reduce the strain upon the couplings, I provide the clamping plates 8 which are disposed above and below the pipes or tubes and between the columns of tubes I arrange a rod 9 upon which are mounted lock nuts 10 which are turned home against the adjacent clamping plates or bars 8 so as to secure them against the tubes or pipes, as is clearly shown in Fig. 2, and to provide a more effectual engagement of the clamping plates or bars with the tubes the opposed faces of the bars may be recessed to provide seats for the tubes, as shown at 11.

Superheaters as now generally constructed are provided with ball joints between the tubes or pipes and the header or manifold. These ball joints are secured in place by clamping bars and bolts and nuts which expand and contract under variations of temperature of the superheater and consequently work loose and permit the joints to leak. This necessitates frequent removing and grinding of the joints so as to compensate for wear and stop the leakage, besides employing a great many parts and making the expense of installation a serious matter. My invention dispenses with the bolts and nuts which are employed to secure the ball joints in place and substitutes for such joints single coupling sleeves which when rotated will simultaneously move axially in the opening in the wall of the header or manifold and upon the end of the superheater tube or pipe so that the tube or pipe will be quickly secured and a tight joint formed. The joint is completed without the employment of a large amount of labor and when completed will overcome all leakage and will last as long as the superheater tubes. As the leakage is effectually avoided by the use of my device the engine will work freely and steam will be produced with a more economical consumption of fuel.

It will be noted that the outer bore of the coupling sleeve is greater than the inner bore so that an annular internal shoulder is provided to limit the movement of the sleeve over the end of the tube and the outer end of the sleeve is also of greater diameter than the inner end thereof so that an external annular shoulder is provided to limit the movement of the sleeve into the header wall. This construction will avoid stripping of the threads so that the parts may be easily separated when worn out or repairs are necessary, while at the same time the threaded engagement of the parts will effect a tight joint to prevent leakage.

Having thus described the invention, what is claimed as new is:

1. In a superheater, the combination with a header having threaded openings through its outer wall, and superheater tubes or pipes having externally threaded ends, of coupling sleeves having their inner ends provided with smooth bores and externally threaded to engage the threaded openings in the wall of the header and having their outer ends provided with internally threaded bores to engage over the ends of the tubes, the outer surfaces of said outer ends being smooth throughout their extent and presenting a plurality of flat faces and the internal and external threads being relatively reversed.

2. In a superheater, the combination with a header having threaded openings in its outer wall, and superheater tubes having externally threaded ends, of coupling sleeves having their inner ends provided with smooth bores and externally threaded to engage the threaded openings in the header and their outer ends internally threaded to engage over the threaded ends of the tubes, the threads at the opposite ends of the coupling being reversed and the threaded bore of the sleeve being greater in diameter than the smooth bore thereof whereby to form an annular internal shoulder to limit the movement of the sleeve on the tube and the external diameter of the inner end of the sleeve being less than the external diameter of the outer end thereof whereby to provide an annular external shoulder to abut the outer surface of the header, the outer end of the sleeve having flat faces throughout its extent.

In testimony whereof I affix my signature.

JOHN J. DONNELLY. [L. S.]